United States Patent [19]

Koppa

[11] Patent Number: 4,715,803
[45] Date of Patent: Dec. 29, 1987

[54] TRIPLE CO-EXTRUDER
[75] Inventor: Daniel A. Koppa, Bloomfield, N.J.
[73] Assignee: Nabisco Brands, Inc., Parsippany, N.J.
[21] Appl. No.: 45,229
[22] Filed: Apr. 30, 1987

Related U.S. Application Data

[63] Continuation of Ser. No. 724,206, Apr. 17, 1985, abandoned.

[51] Int. Cl.$^4$ .................. A21C 3/04; A21C 11/16
[52] U.S. Cl. .................. 425/133.1; 99/450.6; 99/450.7; 425/462
[58] Field of Search .................. 425/133.1, 462, 463; 99/450.6, 450.7

[56] References Cited

U.S. PATENT DOCUMENTS

| | | | |
|---|---|---|---|
| 2,811,117 | 10/1957 | Monaco | 426/556 |
| 3,241,503 | 3/1966 | Schafer | 425/133.1 |
| 3,268,336 | 8/1966 | Hale et al. | 426/284 |
| 3,314,381 | 4/1967 | Fries et al. | 425/131.1 |
| 3,351,026 | 11/1967 | Hayashi | 425/306 |
| 3,422,175 | 1/1969 | Rowland | 264/75 |
| 3,552,654 | 1/1971 | Thomas | 264/45.5 |
| 3,572,259 | 3/1971 | Hayashi | 425/132 |
| 3,583,680 | 6/1971 | Ratingen et al. | 425/113 |
| 3,615,675 | 10/1971 | Fowler et al. | 426/281 |
| 3,653,336 | 4/1972 | Kaneko et al. | 425/132 |
| 3,679,338 | 7/1972 | Lutz | 425/131.1 |
| 3,840,311 | 10/1974 | Wight | 425/131.1 |
| 3,851,084 | 11/1974 | Rossen et al. | 426/249 |
| 3,917,863 | 11/1975 | Kaufman, Jr. et al. | 426/283 |
| 3,945,785 | 3/1976 | Belshaw et al. | 425/132 |
| 3,947,173 | 3/1976 | Dougherty | 425/113 |
| 3,947,178 | 3/1976 | Belshaw et al. | 425/132 |
| 4,028,024 | 6/1977 | Moreland | 425/133.1 |
| 4,047,868 | 9/1977 | Kudo et al. | 425/133.1 |
| 4,054,271 | 10/1977 | Lanzillo | 366/70 |
| 4,093,414 | 6/1978 | Swiatovy | 425/133.1 |
| 4,113,819 | 9/1978 | Hayashi et al. | 264/173 |
| 4,209,536 | 6/1980 | Dogliotti | 426/94 |
| 4,247,504 | 1/1901 | Karpo | 425/133.1 |
| 4,248,824 | 2/1981 | Hattop | 425/133.1 |
| 4,259,051 | 3/1981 | Shatila | 425/133.1 |
| 4,266,920 | 5/1981 | Hayashi et al. | 425/133.1 |
| 4,293,572 | 10/1981 | Silva et al. | 426/439 |
| 4,343,603 | 8/1982 | Pavlow et al. | 425/463 |
| 4,344,969 | 8/1982 | Youngquist et al. | 426/549 |
| 4,356,202 | 10/1982 | Todd | 426/138 |
| 4,360,534 | 11/1982 | Brabbs et al. | 426/560 |
| 4,364,882 | 12/1982 | Doucet | 264/45.9 |
| 4,401,681 | 8/1983 | Dahle | 426/94 |
| 4,416,910 | 11/1983 | Hayashi et al. | 426/283 |
| 4,486,163 | 12/1984 | Pfeilstetter | 99/450.7 |
| 4,455,333 | 6/1984 | Hong et al. | 426/549 |
| 4,469,475 | 9/1984 | Krysiak | 425/132 |
| 4,476,080 | 10/1984 | Komoda et al. | 425/133.1 |
| 4,492,549 | 1/1985 | Rasmussen | 425/133.1 |
| 4,503,080 | 3/1985 | Brabbs et al. | 426/502 |
| 4,511,318 | 4/1985 | Kolodesh et al. | 425/133.1 |
| 4,522,775 | 6/1985 | Briggs et al. | 425/133.1 |
| 4,528,900 | 7/1985 | Simelunas | 99/450.1 |
| 4,534,726 | 8/1985 | Simelunas | 425/363 |
| 4,578,027 | 3/1986 | Koppa et al. | 425/437 |
| 4,579,744 | 4/1986 | Thulin et al. | 426/283 |

FOREIGN PATENT DOCUMENTS

| 31718 | 7/1981 | European Pat. Off. . |
| A168255 | 1/1986 | European Pat. Off. . |
| 2556254 | 9/1976 | Fed. Rep. of Germany . |
| 2222015 | 10/1974 | France . |

OTHER PUBLICATIONS

Certified translation of Germany 2556254 above into English by A. H. 3/27/87.
Translation into English of Germany 2556254 above, which is attached thereto, certified for parent of this application by A. H. 3/27/87.

Primary Examiner—Willard Hoag
Attorney, Agent, or Firm—Richard Kornutik

[57] ABSTRACT

An extruder provides three materials, one co-extruded about the other. A first material is completely enrobed by a second material, which in turn is completely enrobed by a third material. The first and third materials are preferably cookie doughs having differing compositions, the first material forming the core and having a moist and chewy texture upon baking. The third material is preferably a cookie dough having a relatively crispy texture upon baking. The second material serves as a moisture barrier and to prevent bleeding between the first and the third materials. The second material may be composed of, for example, an oil-based fluidic material or a gel.

1 Claim, 14 Drawing Figures

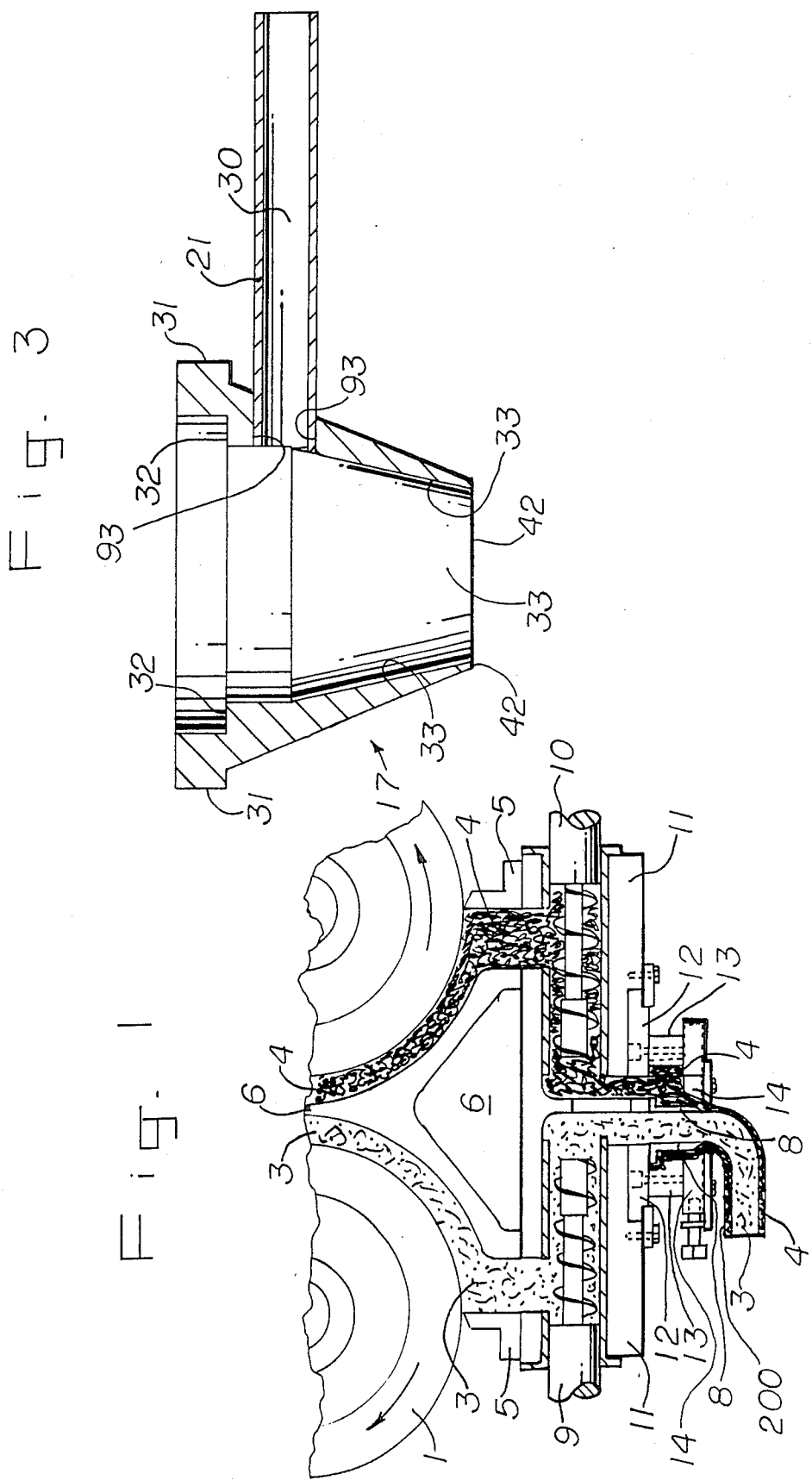

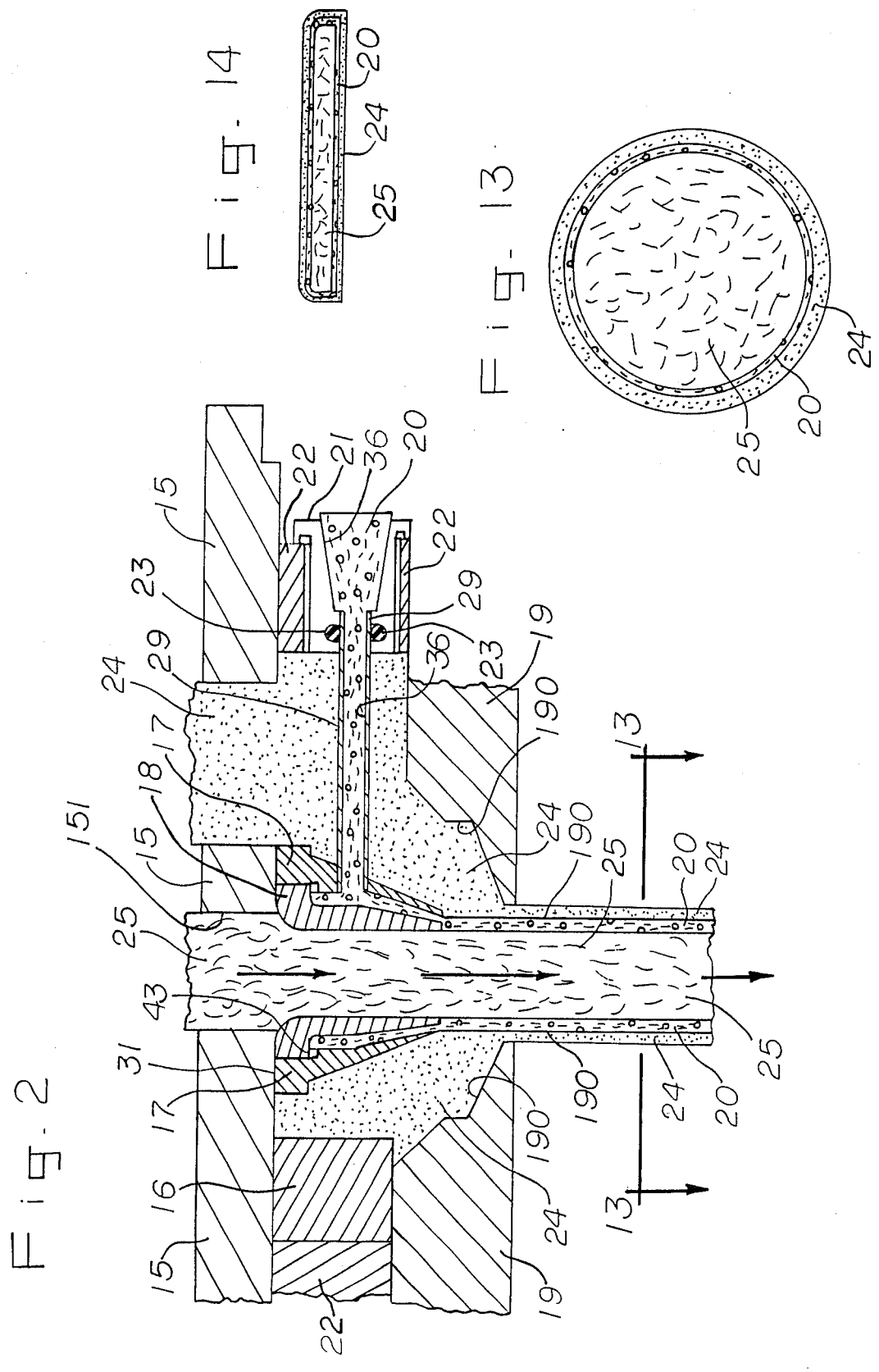

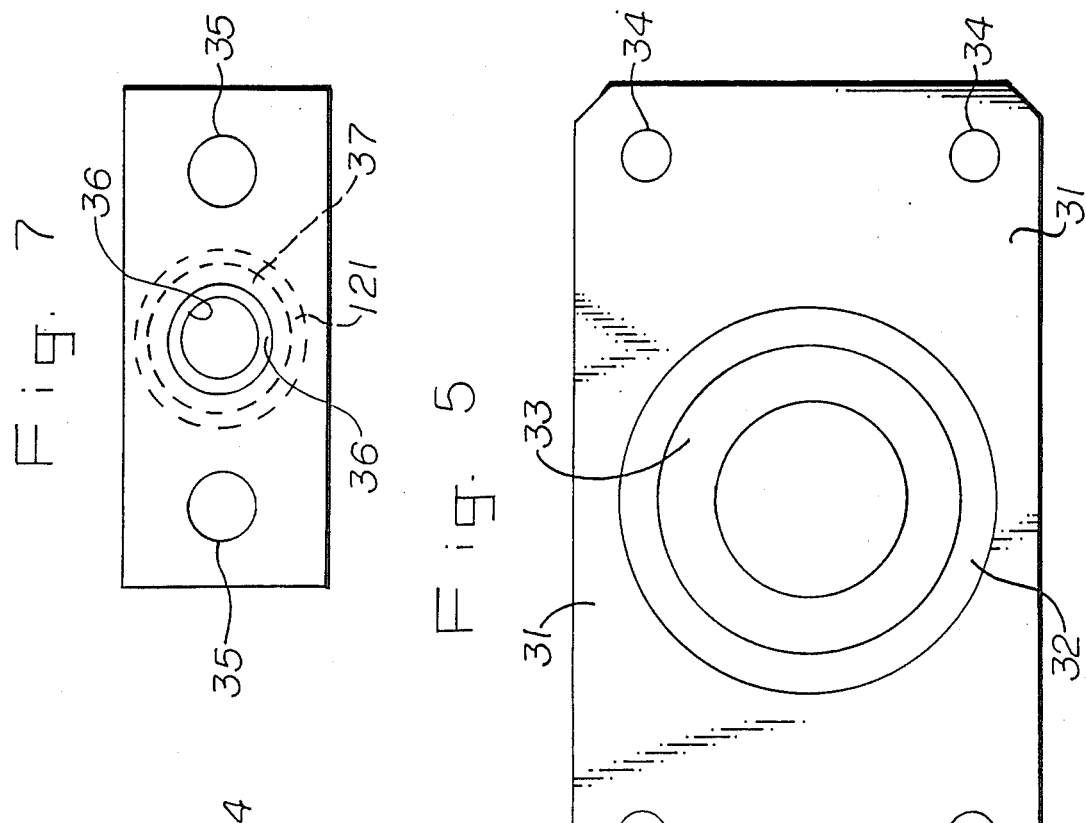

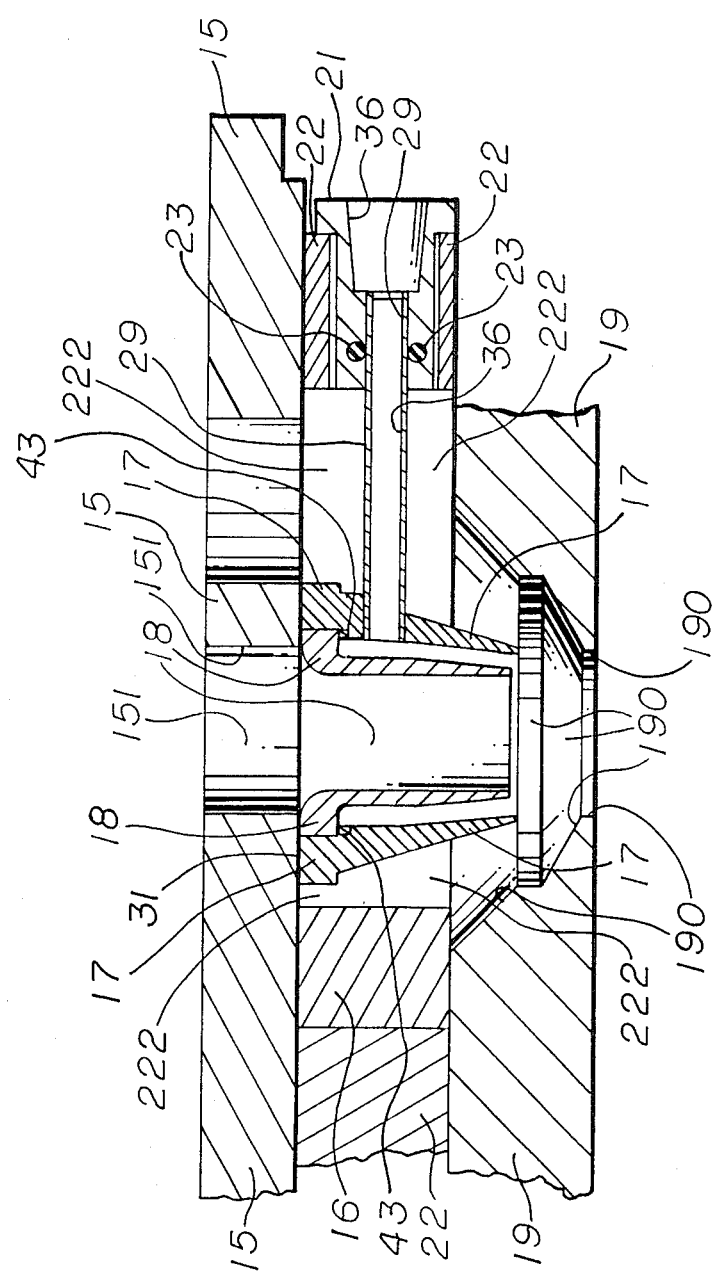

TRIPLE CO-EXTRUDER

CROSS-REFERENCE TO RELATED APPLICATION

This is a continuation of U.S. patent application Ser. No. 724,206 filed Apr. 17, 1985 now abandoned.

BACKGROUND OF THE INVENTION

It is known in the art to co-extrude two separate doughs. Such a co-extruder is useful in forming an extrudate rope having a multi-texture dough, for example an outer dough having a crispy texture when baked, with the inner dough having a chewy and moist texture after baking.

The prior art has not, however, solved the problem of providing an extruded rope composed of three separate materials, for example three separate doughs, including an inner-most core, which inner-most core is surrounded by an intermediate layer, which in turn is surrounded by a third layer.

Examples of types of apparatus for forming a co-extruded product include the following.

For example, U.S. Pat. Nos. 4,113,819, 4,266,920 and 4,416,910, all to Hayashi, describe apparatus and processes for manufacturing multi-layered dough materials comprising layers of dough and fat or oil, such as butter. These processes involve co-extrusion of dough and fat through a die having concentric annular orifices to form a hollow tube in which an inner layer of fat is surrounded by an outer layer of dough. In U.S. Pat. Nos. 4,413,819 and 4,416,910, this tube is then collapsed under its own weight on to a first conveyor, which passes it under a rolling assembly comprising a plurality of rolls which are themselves carried around an endless belt. At the end of the first conveyor, the rolled sheet passes downwardly to an oscillating chute, which oscillates parallel to the direction of motion of the first conveyor, and is formed into a pile, comprising multiple plies of the sheet, on a second conveyor, which conveys it under second rolling assembly generally similar to the first one already described.

In the apparatus shown in U.S. Pat. Nos. 4,113,819 and 4,416,910, both orifices of the co-extrusion die are annular. The patents discuss the possibility of using a die having orifices of flattened or rectangular form, but state that, since the elevation angles of various portions of the inner faces of the nozzles are considerably different from each other because of the required changes in the cross-section of the channels used to feed material to the orifices of such a flattened die, such flattened or rectangular orifices are to be avoided because the discharge speed is different between the middle and end portions of the rectangular orifices. Such changes in discharge speed would result in non-uniformity of the thickness of the layers of fats and dough forming the co-extruded tube, and might result in distortion or rupture of the tube. Also, if in accordance with the teachings of these patents annular dies producing a hollow cylindrical tube are used, and if this tube is have the diameter desirable to produce a sheet of the desired width for high-speed production, the dies required are extremely large, cumbersome and expensive to form.

U.S. Pat. No. 3,572,259 to Hayashi discloses a process in which a cylinder of dough filled with a filler is co-extruded in the same manner as in U.S. Pat. No. 4,113,819, and the co-extruded cylinder is thereafter formed into double-layered spheres. A similar method, not restricted to the co-extrusion technique of U.S. Pat. No. 4,113,819, is disclosed in U.S. Pat. No. 3,351,026 to Hayashi.

Other types of devices for providing additional material to a co-extruded product, are discussed as follows.

Moreland, in U.S. Pat. No. 4,028,024 teaches manufacture of filled capsules using a co-extruder. The product formed by this co-extruder is a capsule having a medicament or edible substance encased in a casing formed of gelatin or dough. The capsule may be a single color or may have different colors on opposite sides of a single capsule. This two-colored capsule is formed in the extruder by using different colored materials in conduits 13, 14 of the apparatus of FIG. 4. As seen in this figure, the core material enters through an orifice 61 surrounded by a body part 59 having inlet openings on opposite sides thereof. This permits entry of the two differently colored materials on opposite sides of the orifice 61, with a body part 69 causing merging of the inner and outer layers into a single co-extrudate body. While three conduits are provided, only two materials are taught, having a total of potentially three different colors. There is no teaching of an extrudate product having an inner core material, a second co-extrudate material surrounding the core material, and a third co-extrudate material surrounding the second co-extrudate material.

In U.S. Pat. No. 3,314,381 to Fries et al., an apparatus is shown for filling baked products. The "co-extrudate" product formed is in fact an extruded material forming the interior and the exterior material portions of the final extrudate product. A second material is injected into the body of the first material during extrusion thereof by a spiral-shaped member having a plurality of orifices therein, to release a second material in a spiral-shaped pattern into the first material. There is no teaching of an extrudate product having an inner core material, a second co-extrudate material surrounding the core material, and a third co-extrudate material surrounding the second co-extrudate material.

In particular, it is a problem in the art to prevent, in a co-extruded dough, "bleeding" between the inner-most dough layer and the enrobing dough layer which surrounds the inner-most dough layer. Furthermore, where such doughs are sufficiently different in the amount of moisture they contain, it is a problem to prevent moisture migration from, for example, the inner-most dough layer to the enrobing dough layer.

SUMMARY OF THE INVENTION

The present invention teaches an apparatus for providing a triple co-extruded product, and also teaches a particular type of co-extruded product formed by the above-mentioned apparatus.

In the present invention, an apparatus is shown which forms a fluid material into a triple co-extruded product. By the phrase "triple co-extruded" is meant an end product having an inner-most material of a first composition, which is surrounded an intermediate layer of material, preferably of a second composition, which in turn is completely surrounded by a third layer of material, preferably of a third composition. The final product preferably leaves no air gaps between the inner-most layer, the intermediate layer, and the outer-most layer. By the term "enrobed" is meant that a layer is completely surrounded by, and is in contact with, another layer, surrounded by, and is in contact with, another layer.

In the present invention, a supply of a first fluid material supplies an orifice. The orifice is surrounded by a nozzle arranged in an annular manner. A second fluid material is supplied into the region between the nozzle and the orifice, under sufficient pressure so as to force the material therebetween.

Preferably, material is supplied to the nozzle by at least one conduit formed in a side of the nozzle and extending outwardly a predetermined distance so as to be spaced apart therefrom. A second nozzle is disposed in an annular fashion, and a supply of a third fluid material is supplied between the first and the second nozzle members. The third material, according to the preferred embodiment of the present invention, flows around the conduit to reach the nozzle outlet area, so that each of the three fluid materials are co-extrudable together to form a composite extrudate rope having a core formed of the first material, an intermediate layer formed of the second material, and an outer enrobing layer formed of the third material.

A particular product formed by the present invention includes a core material composed of dough which, when baked, is moist and chewy; the third material forming the outer, enrobing layer being composed of a dough which, upon baking, is relatively crispy, both the first and the third materials discussed hereinabove being known in the art as described in the foregoing; the second intermediate layer being a moisture barrier to prevent migration of moisture between the first and the third material layers.

Here, the second material in a particular product embodiment is an oil-based material, composed substantially entirely of an edible oil, which serves as a barrier between the first material and the third material. This intermediate layer formed of the second material can also be used to prevent bleeding of colors, of salt, or of any other chemicals or properties which may occur due to the contact which would otherwise be present between the first and the third materials.

In another type of product formed, the first and third materials are of doughs as discussed in the above, while the second, intermediate material layer is of a gel which is substantially water-based, such as an alginate gel, which also serves as a moisture barrier between the first and the third material layers.

Further details and advantages of the present invention appear from the following description of a preferred embodiment shown schematically in the drawings.

BRIEF DESCRIPTION OF THE DRAWINGS

FIG. 1 is a sectional view of a prior art co-extrusion apparatus showing two different materials being co-extruded;

FIG. 2 is a sectional view showing three different materials being extruded according to the present invention;

FIG. 3 is a sectional view of a first nozzle according to the present invention including a feed conduit;

FIG. 4 is an end elevational view of the first nozzle and conduit according to the present invention as seen from the right of FIG. 3;

FIG. 5 is a top elevational view of the first nozzle as seen from the top of FIG. 4;

FIG. 6 is a sectional side view of a conduit connecting member having an opening therein communicating with the conduit;

FIG. 7 is an elevational view of the conduit connecting member shown in FIG. 6 as seen from the right of FIG. 6;

FIG. 10 is a sectional side view of the assembly shown in FIG. 2, omitting the three materials flowing through the passages formed thereby;

FIG. 13 is a cross-sectional view taken along line 13—13 of FIG. 2;

FIG. 14 is a cross-sectional view of a food product according to the present invention.

DETAILED DESCRIPTION OF THE INVENTION

Figure 11:
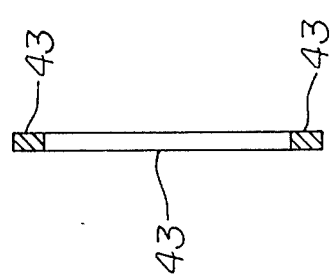
FIG. 11 is a top elevational view of a washer used in the assembly of FIG. 10.

FIG. 1 shows a prior art co-extruder apparatus showing a pair of rollers 1, 2 supplying two different extrudate materials 3, 4, respectively. A pair of screw feed mechanisms 9,10 force the respective doughs 3,4 through a die assembly so that an extrudate rope 100 is formed having an inner layer 3 and an outer layer 4, the outer layer 4 enrobing the dough material 4.

The rollers 1,2 are disposed on opposite sides of a separator member 6. The separator member 6 has a lower extension which also serves to maintain separation of the two doughs 3,4. An externally supported member 61 supports the blocking member 6. A lower die head support block 11 underlies the screw extruders 9,10 and also, in combination with a nozzle 8, prevents comingling of the doughs 3,4. The nozzle 8 is supported by a member 12 fixedly connected to the member 11, and the nozzle 8 is also at least partially supported by the member 7. A spacing member 13 permits the dough 4 to surround the nozzle 8 in the region between the plate 12 and a die head 14.

The die head 14 itself forms a nozzle to cause the dough 4 to surround the dough 3 during the co-extrusion of each of the doughs in the region of the nozzle 8 and the die head 14.

As seen in FIG. 1, the nozzle 8 could be circular in cross-section, as could the opening in the die head 14 be circular. This would form a usual prior art co-extruded product having an outer dough concentrically extruded about an inner dough.

As the rollers 1,2 rotate to supply dough at a generally predetermined rate to the screw extruders 9,10, upstanding sidewalls 5 direct the doughs 3,4 to the respective screw extruders 9,10. Rotary motors, or any other source of rotary motive power, can be used to separately and independently drive the rollers 1,2 as well as the screw extruders 9,10. Alternatively, a single rotary drive means can be used to drive all of the rotating parts through use of suitable gearing, belts, or the like to provide the appropriate rotational speeds desired.

FIG. 2 is a sectional view similar to that shown in FIG. 1, showing three doughs being triple co-extruded by an apparatus according to the present invention. In FIG. 2, the means for supplying dough 25 as the core dough in the final product, as well as the means for supplying the outer-most dough layer 24, are omitted since these can be substantially as shown in FIG. 1, which is well-known in the prior art. Alternatively, any other types of supply of the doughs 24,25, respectively, can also be used, for example a gear metering pump could be used to supply a predetermined amount of dough to each of the portions of the novel die according to the present invention. The materials need not be doughs, but instead other materials could be used, such as a candy material and a dough, two candy materials, a pharmaceutical material such as a medicine which would be used as the material 25 to be surrounded by an encapsulating material 24, and so on. There are many other materials usable with the present apparatus, and all such uses are contemplated as being within the scope of the present invention for use in the present invention. The present invention is not to be construed as being limited to any particular materials processed thereby.

A material 20 forms an intermediate co-extruded layer which is extruded in between the core layer 25 and the outer-most layer 24. It is contemplated as being within the scope of the present invention to use any type of feed apparatus for supplying the material 20, in combination with any suitable drive means. Any type of supply can be used, for example a hopper, an oil drum, a bin, or the like. Furthermore, where only a small amount of material 20 is to be used, the feed apparatus itself may hold all of the material 20 needed, in which case a supply could be omitted. The material 20 can also be supplied by a gravity feed, that is, by elevating the supply to a suitable height and supplying the material 20 by a conduit connected to the connecting collar 21 so that the material 20 will flow under the influence of gravity.

In FIG. 1, the extrudate material 200 is shown being carried away from the die head 14 so that the extrudate rope is curved in the vicinity of the die through an arc of 90°. In practice, this is done by providing a conveyor belt (not shown in the drawings) directly beneath the surface of the extrudate rope as seen in FIG. 1, so that the conveyor belt itself causes the bending shown. Such can also be the case in FIG. 2, although not shown. Any processing means for handling the extrudate rope 200 formed by the apparatus of the present invention is contemplated as being within the scope of the present invention.

A top member 15 has an inlet opening 151 therethrough and another inlet opening 152 therethrough. The inlet opening 151 receives the material 25, while the opening 152 receives the material 24. The materials 24 and 25 may be any materials capable of flowing, for example, dough, plastic materials, or may even include particulate material such as raisins, peanuts, chocolate chips, decorettes, or the like.

A plate member 22 is fixedly positioned so as to be adjacent the plate member 15. The plate 22 has an opening 222 therein to accommodate a spacer block 16, a first nozzle member 18, and a second nozzle member 17. The member 22, as seen in the right-hand portion of FIG. 2, has a horizontal passageway 28 formed therein to receive a collar 21, so as to support the collar 21 to maintain the position of a conduit 29.

The conduit 29 supplies the material 20 between the nozzles 17 and 18, the conduit 20 being fixedly connected to the nozzle member 17. As seen in FIG. 2, the material 24 flows around the conduit 29, so that the conduit 29 does not completely obstruct the passageway 222 formed in the member 22. A third member 19 has an opening 190 therein which forms a third nozzle member. The opening 190 has a generally conical, stepwise configuration to permit a relatively uniform flow of the material 24 therethrough.

As seen in FIG. 2, the first nozzle 18 has an upper end configured to be snugly received between the block 15, a washer 43, and an inner-most surface of the nozzle 17. The upper portion of the nozzle 17 has a surface for supporting the washer 43, so that the nozzles 17 and 18 are precisely oriented relative to one another so that a relatively thin intermediate layer may be co-extruded between the materials 24 and 25. However, in this arrangement any predetermined spacing can be maintained between the nozzles 17 and 18 to form even a relatively large intermediate layer very precisely. The nozzle 17 can be welded, clamped, bolted, or otherwise attached to the block 15. Also, alternatively, the conduit 29 can be made sufficiently strong and rigid, as can the block 22 having opening 28 therein for receiving collar 21 and the conduit 29, so that the conduit 29 alone supports the nozzle 17 sufficiently strongly against the block 15. This strength of support is necessary to prevent leakage of the material 25 between the block 15 and either or both of the upper portions of the nozzles 17 and 18. In the preferred embodiment, the upper portion of the nozzle 17 is fixedly connected to the block 15 directly, as by welding, riveting, bolts, adhesive, or the like.

As seen in FIG. 2, a triple co-extrudate material 200 leaves the lower-most surface of the die 19.

Also as seen in FIG. 2, an O-ring 23 is used to tightly secure the conduit 29 against leakage to the collar 21, the O-ring 23 serving as a fluid-tight barrier so as to prevent the material 24 from seeping between the conduit 29 and the collar 21. Any other means for providing a fluid barrier are also contemplated as being within the scope of the present. Furthermore, no fluid-tight seal need be employed at all, so long as the rate of leakage of the material 24 between the conduit 29 and the collar 21 is maintained at an acceptable level.

FIG. 3 is a view of the nozzle 17 similar to that shown in FIG. 2, with the nozzle 17 and its attached conduit 29 being shown isolated in FIG. 3 for clarity. As seen in FIG. 3, the conduit 29 has an interior surface 30. The nozzle 17 has an interior surface 33, and a ledge 32 for supporting the O-ring 43 shown in FIG. 2.

The nozzle 17 has a lower-most end 42 which is tapered to nearly a point, for permitting precision fluid flow. The nozzle 17 also has an outer-most, upper periphery 31. The conduit 29 is located within a generally cylindrical interior opening 93 formed completely through the nozzle 17, so as to permit communication between the interior region of the conduit 29 and the interior 33 of the nozzle 17, to supply material to the interior of the nozzle 17.

The material used for the above-mentioned parts is preferrably stainless steel. Also, teflon materials, plastic materials, and ceramic materials may all be used as well. Furthermore, any materials can be used with the present invention, although stainless steel is preferred for its durability, strength, and resistance to corrosion.

FIG. 4 is an elevational view of the nozzle 17 as seen from the right of FIG. 3. Here, the conduit 29 is seen in its true circular outline. It is contemplated as being within the scope of the present invention, however, that any cross-sectional shape for the conduit 29 can be used. For example, the cross-sectional of the conduit 29 can be square, triangular, elliptical, or in fact a plurality of conduits 29 can be used to supply the nozzle 17. The conduit 29 is also preferably of stainless steel, although any other material may be used which is sufficiently strong to permit passage of the material 24 thereabout while conducting fluid 20 therethrough.

As seen in FIG. 4, the nozzle 17 has an elongated upper portion 31 which is generally planar along its upper surface, which is adapted to abut the block 15 in fluid-tight engagement. Bolt holes 32 are shown in dotted outline in FIG. 4 for securing of the nozzle 17 to the block 15. The elevational view of FIG. 4 also shows the generally conical shape of the nozzle 17.

It is contemplated as being within the scope of the present invention, however, that the nozzle 17 may have any cross-sectional shape so long as it completely surrounds the nozzle 18. For example, the nozzle 18 can be of circular cross-sectional shape with the nozzle 17 being of elliptical, square, triangular, or other cross-sectional shape. However, this is not the preferred embodiment, the preferred embodiment being that the nozzle 17 has a circular cross-sectional outline along the axis of the generally conically-shaped outer-most periphery of the nozzle 17. Also, it is contemplated as being within the scope of the present invention that the nozzles 17 and 18 may have similar shapes which are non-circular in the cross-sectional outline. For example, the nozzles 17 and 18 can be formed as ellipses having a predetermined spacing between any two respective locations on the nozzles 17 and 18, the nearest points being defined as the minimum straight-line distance between a point on the outer surface of the nozzle 18 and a point on the inner-most surface of the nozzle 17.

FIG. 5 is a top elevational view of the nozzle 17 of FIGS. 3 and 4. Here, the inner surface 33 of the nozzle 17 is seen as terminating in a circular inner-most periphery and having a circular outer-most periphery where the surface 33 meets the surface 32. This surface 32 actually represents the ledge upon which the washer 43 rests. The bolt holes 34 are seen in true outline in FIG. 5, four bolt holes 34 being present in FIG. 5. Thus, in the preferred embodiment, the nozzle 17 is bolted to the block 15 by means of bolts passing through the bolt holes 34 and into threaded bores (not shown) in the block 15.

FIG. 6 is a cross-sectional view of the collar 21, having an inlet 36 adapted to receive the conduit 29 from the nozzle 17. The nozzle 36 has a recess 37 in which the O-ring is disposed. The collar 21 has a left-most surface 41, and also has an abutment surface 121 seen along the left-most portion of the collar extension in the right-hand portion of FIG. 6. The right-most portion of the bore 36 is tapered as seen in FIG. 6, to provide an enlarged opening for directing fluid flow into the narrower portion of the bore 36.

FIG. 7 is an elevational of the collar 21 as seen from the right of FIG. 6. Here, it is seen that the collar 21 is anchored to the block 22 by bolts passing through bores 35. A pair of bores 35,35 are provided, and the bolts are anchored in the preferred embodiment by threaded bores (not shown) formed in the block 22. The relationship of the collar 21 and block 22 is seen clearly in FIG. 2. The bore 36 is seen in FIG. 7, with the collar extension portion 121 being depicted in dotted outline in FIG. 7.

Figure 8:
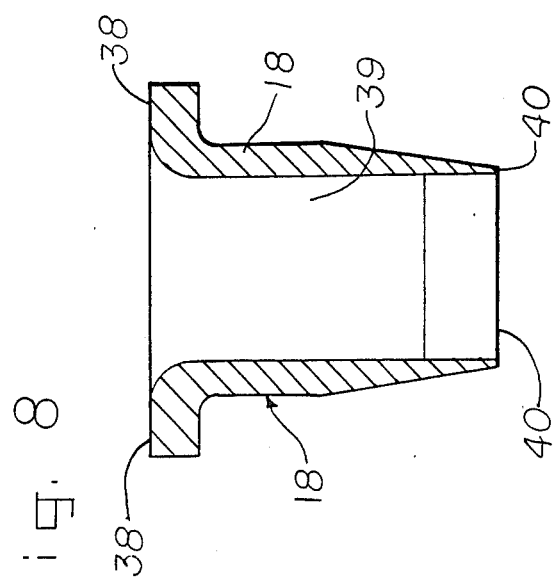
FIG. 8 is a sectional side view of an orifice usable in the present invention.

FIG. 8 is a cross-sectional view of the nozzle 18 of the present invention. As seen in FIG. 8, the nozzle 18 has an interior surface 39, and upper-most surface portion 38, and a lower-most tapering edge 40. The tapering edge 40 is useful in permitting a resultant regular and precise flow pattern of the material flowing through the nozzle 18 and also for the material flowing around the outside of the nozzle 18. The material flowing outside of the nozzle 18 is the material 20, which is directed to flow between the outer-most surface of the nozzle 18 and the inner-most surface of the nozzle 17.

Figure 9:
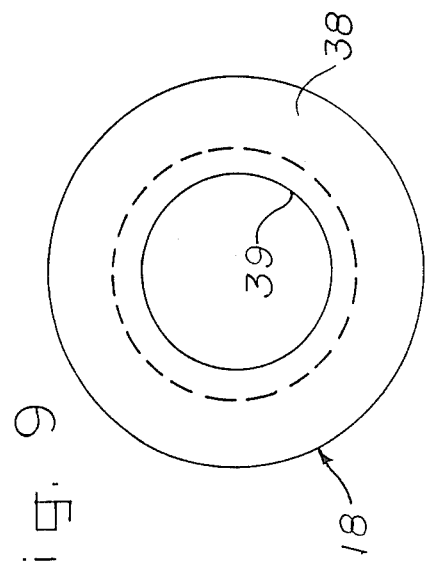
FIG. 9 is a top elevational view of the orifice member shown in FIG. 8.

FIG. 9 is an elevational view of the nozzle of FIG. 8, as seen from the top of FIG. 8. Here, the circular outline of the upper surface 38 of the nozzle 18 is seen in its true view. Also, the circular interior periphery 39 is seen in its true view in FIG. 9.

As discussed in the above, the nozzle 18 need not be circular, but may be of any cross-sectional outline, and may even vary along its longitudinal axis of rotation, so long as it fits within the nozzle 17.

FIG. 10 is a sectional view of the apparatus similar to that shown in FIG. 2, with the materials 20, 24, and 25 being omitted for clarity. Thus, the interior of the nozzle 18 is visible in FIG. 10 in elevational view in FIG. 10. The individual elements in FIG. 10 are as discussed with reference to the preceding FIGS. 1-9.

FIG. 11 is a top elevational view of a washer 43 used in the present invention, which washer 43 fits atop the ledge 32 of the nozzle 17.

Figure 12:
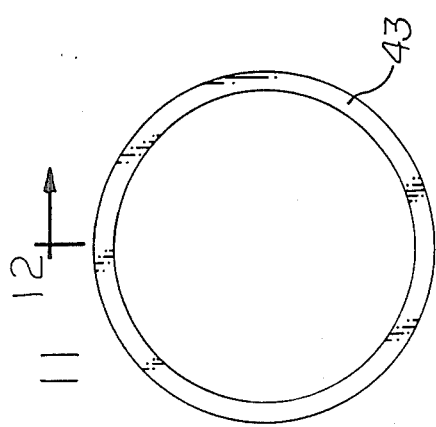
FIG. 12 is a sectional side view of the washer of FIG. 11 taken along line 12—12 of FIG. 11.

FIG. 12 is a cross-sectional view of the washer 43 taken along line 12—12 of FIG. 11.

As to the prior art of FIG. 1, U.S. application Ser. Nos. 507,401; 540,981; and 507,469 all teach co-extrusion for making an enrobed food piece, as well as apparatus therefor and apparatus for working or severing the enrobed food piece. These applications are expressly incorporated herein by reference. In particular, in U.S. Ser. No. 507, 469, FIG. 1 shows a perspective view of a pair of rollers rotating in opposite directions to supply dough to a pair of extruding screws for co-extruding a food piece. Furthermore, the doughs, comestible substances such as jams, jellies, and the like, are also discussed therein and such teachings are incorporated herein by reference as illustrative of the types of materials usable with the present invention.

In U.S. Ser. No. 507,401, to Pinto, filed June 24, 1983, the entire disclosure of which is expressly incorporated herein, a method and apparatus for forming edible products having an inner portion enveloped by a dissimilar outer portion, is shown. In particular, FIGS. 15-17 show a food product formed by the apparatus therein. This is also illustrative of the types of products usable with the present invention.

FIG. 13 is a cross-sectional view taken along line 13—13 of FIG. 2. It shows the cross-sectional shape of the extrudate rope 200, clearly showing the three materials 20, 24, and 25.

FIG. 14 is a cross-sectional view of a food product such as a cookie formed by the present invention. The cookie has an inner layer 25 formed of a dough which is moist and chewy after baking, and with an outer layer 24 which is composed of a dough which is crisp upon baking. The intermediate layer 20 prevents moisture migration from the dough 25 to the dough 24. The material 20 is in the preferred embodiment either an oil-based material or an alignate gel-type of material. The barrier material 20 preferably is of such a composition in the final product that it does not leach material or color from either of the layers 24 or 25. By the present invention, an extrudate rope as shown in FIG. 13, and a product as shown in FIG. 14, are formed. The particular choice of the materials 24 and 25 as edible doughs, and the choice of the material 20 as an oil or gel for use in preventing moisture migration and for preventing bleeding, is also an aspect of the present invention.

Suitable doughs 24 are well-known, and are described in the prior art herein by reference, as well as by other prior are which is well known to anyone having skill in the art. The use of a dough 25 which is moist and chewy upon baking, is also well-known in the prior art. However, it is the use of the intermediate material 20 which forms a new product which is more stable and would tend to have a greater shelf life than the products known in the prior art.

The present invention is capable of achieving the above-enumerated advantages and results, and while a preferred embodiment has been set forth, the scope of the present invention is not limited thereto but may be embodied within the scope of the following claims.

What is claimed is:

1. An extrusion apparatus for co-extruding three streams simultaneously and having three generally concentric flow passages defined by a die, said die comprising: three plates in face abutting relationship, a first of said plates being a block attached to means for extruding two materials, said block defining two side-by-side apertures, each being in communication with said means for extruding, an extrusion nozzle defining a generally cylindrical internal axial passage and a second annular orifice concentric with said passage, said nozzle having an internal sleeve member inserted within and radially spaced from a conical member to form both the internal passage and said annular passage with said conical member having a conduit fixed thereto and radially extending from the exterior of said conical member and in communication with said annular passage, a second plate abutting with said first of said plates, said conical member abutting said first of said plates such that a flow passage is defined by said internal axial passage communicating with a first of said apertures, a second of said apertures communicating with an aperture defined by said second plate and surrounding said nozzle, a third of said plates defining an extrusion orifice for the three streams, the second of said plates defining an opening extending generally parallel to a face of said plates through which said radially extending conduit projects for communication with a third extrusion means.

* * * * *